(12) United States Patent
Iwasa

(10) Patent No.: US 11,237,040 B2
(45) Date of Patent: Feb. 1, 2022

(54) LIGHT PROJECTION SYSTEM AND COMBINATION WEIGHING DEVICE PROVIDED WITH SAME

(71) Applicant: Ishida Co., Ltd., Kyoto (JP)

(72) Inventor: Seisaku Iwasa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 156 days.

(21) Appl. No.: 16/493,151

(22) PCT Filed: Feb. 2, 2018

(86) PCT No.: PCT/JP2018/003633
§ 371 (c)(1),
(2) Date: Oct. 15, 2019

(87) PCT Pub. No.: WO2018/168246
PCT Pub. Date: Sep. 20, 2018

(65) Prior Publication Data
US 2020/0056932 A1 Feb. 20, 2020

(30) Foreign Application Priority Data
Mar. 17, 2017 (JP) .............................. JP2017-053605

(51) Int. Cl.
*G01G 23/32* (2006.01)
*G01G 19/387* (2006.01)
*G01G 21/28* (2006.01)
*B23Q 11/00* (2006.01)

(52) U.S. Cl.
CPC ............. *G01G 23/32* (2013.01); *B23Q 11/00* (2013.01); *G01G 19/387* (2013.01); *G01G 21/28* (2013.01)

(58) Field of Classification Search
CPC .... G01G 19/387; G01G 19/393; G01G 21/28; G01G 23/32; B23Q 11/00
See application file for complete search history.

(56) References Cited

U.S. PATENT DOCUMENTS
2015/0211581 A1  7/2015 Murphy et al.

FOREIGN PATENT DOCUMENTS
| JP | H06-275383 A | 9/1994 |
| JP | 2000-289717 A | 10/2000 |
| JP | 2002-107115 A | 4/2002 |

(Continued)

OTHER PUBLICATIONS

Computer translation of JP,2013-193141,A downloaded from the JPO website, Jul. 8, 2021.*

(Continued)

*Primary Examiner* — Randy W Gibson
(74) *Attorney, Agent, or Firm* — Studebaker & Brackett PC

(57) ABSTRACT

A light projection system is a light projection system projecting light on a plurality of processing apparatuses installed in a factory, and includes an acquisition unit acquiring, from each of the processing apparatuses, state information indicating abnormality in the processing apparatus, a light emission unit capable of projecting the light on each of the processing apparatuses, and a projection controller controlling a mode of the light projected from the light emission unit such that the mode of the light reflected from each of the processing apparatuses is changed, on the basis of the state information indicating abnormality.

18 Claims, 9 Drawing Sheets

(56) References Cited

FOREIGN PATENT DOCUMENTS

| JP | 2006-133093 A | 5/2006 |
|----|---------------|--------|
| JP | 2010-019737 A | 1/2010 |
| JP | 2010-197127 A | 9/2010 |
| JP | 2010-230567 A | 10/2010 |
| JP | 2013-193141 A | 9/2013 |
| JP | 2014-132288 A | 7/2014 |
| JP | 2017-168791 A | 9/2017 |

OTHER PUBLICATIONS

Computer translation of JP,2006-133093,A downloaded from the JPO website, Jul. 8, 2021.*
International Search Report issued in PCT/JP2018/003633; dated Apr. 3, 2018.
International Preliminary Report on Patentability and Written Opinion issued in PCT/JP2018/003633; dated Sep. 17, 2019.
The extended European search report issued by the European Patent Office dated Nov. 26, 2020, which corresponds to European Patent Application No. 18767355.3-1001 and is related to U.S. Appl. No. 16/493,151.

* cited by examiner

LIGHT PROJECTION SYSTEM AND COMBINATION WEIGHING DEVICE PROVIDED WITH SAME

TECHNICAL FIELD

An aspect of the present invention relates to a light projection system and a combination weighing apparatus provided with the same.

BACKGROUND ART

Combination weighing apparatuses are known. The combination weighing apparatuses measure weight values of articles put into a plurality of hoppers from outside, and perform combination weighing using the measured weight values. For example, Patent Literature 1 discloses a combination weighing apparatus notifying the worker and the manager (hereinafter referred to as "the workers") of occurrence of discharge failure, when the apparatus senses that the article to be weighed is not completely discharged from the weighing hopper, by displaying occurrence of discharge failure on the display screen, flickering the display picture, or generating error notification sound.

CITATION LIST

Patent Literature

Patent Literature 1: Japanese Unexamined Patent Publication No. 2010-230567

SUMMARY OF INVENTION

Technical Problem

However, although the conventional combination weighing apparatus described above is capable of notifying the workers that a specific section is in a specific state, the conventional combination weighing apparatus has difficulty in causing the workers to recognize, at first glance, which part the specific section actually corresponds to. In addition, as the size of the processing apparatus increases, the number of sections serving as the target increases, and the area to be checked also increases. For this reason, the conventional combination weighing apparatus has difficulty in causing the workers to recognize, at first glance, which part the specific section actually corresponds to.

To deal with the problem, it is possible to take a measure of notifying the workers of the corresponding section by displaying the general view of the system, and displaying the part corresponding to the corresponding section with color or the like. However, also in this case, difficulty exists in looking out over the whole apparatus in front of the system with a large size, and causing the workers to recognize, at first glance, which part the section actually corresponds to. When the workers go away from the apparatus to look out over the whole apparatus, it becomes impossible for the workers to visually recognize the display screen displaying the general view.

For this reason, an object of an aspect of the present invention is to provide a projection system capable of causing the workers to recognize, at first glance, that the processing apparatus or a section of the processing apparatus is in a specific state and which part the processing apparatus or section in the specific state actually corresponds to, and a combination weighing apparatus provided with the same.

Solution to Problem

A light projection system according to an aspect of the present invention is a light projection system projecting light on at least one processing apparatus installed in a factory, and comprises: an acquisition unit configured to acquire, from each of the processing apparatuses, state information indicating a state of the processing apparatus; a light emission unit configured to project the light on each of the processing apparatuses; and a projection controller configured to control a mode of the light projected from the light emission unit such that the mode of the light reflected from the processing apparatus is changed, on the basis of the state information.

In the light projection system with this structure, the projection controller controls a mode of the light projected from the light emission unit such that the mode of the light reflected from the whole or part of the processing apparatus is changed, on the basis of the state information. This structure changes the mode of the light reflected from the whole or part of the processing apparatus according to the state of the processing apparatus or the section, and enables the worker to recognize the processing apparatus or the section thereof in the specific state, at first glance of the processing apparatus. In addition, in the light projection system with this structure, the light emission unit projects light on the whole or part of the processing apparatus, as well as simply emits light. This structure enables visual recognition of the processing apparatus or part thereof in the specific state to be distinguished from another processing apparatus or part thereof, and enables the worker to recognize which part the processing apparatus or a section thereof in the specific state actually corresponds to, at first glance of the processing apparatus. As a result, this structure enables the workers to recognize, at first glance, that the processing apparatus or a section in the processing apparatus is in a specific state and which part the processing apparatus or a section thereof in the specific state actually corresponds to.

In the light projection system according to an aspect of the present invention, the acquisition unit may acquire the state information from each of the processing apparatus on an individual basis, and the light emission unit may be provided to be configured to project light on whole or part of the processing apparatus. The light projection system with this structure enables the workers to recognize, at first glance, that the processing apparatus is in a specific state. In addition, the light projection system with this structure enables the workers to recognize, at first glance, the processing apparatus in a specific state in a plurality of processing apparatuses.

In the light projection system according to an aspect of the present invention, the acquisition unit may acquire the state information from the processing apparatus on a part-specific basis, and the light emission unit may be provided to be configured to project light on the processing apparatus on the part-specific basis. The light projection system with this structure enables the workers to recognize, at first glance, a section in a specific state in a plurality of sections included in one processing apparatus.

In the light projection system according to an aspect of the present invention, the state information acquired with the acquisition unit may be information indicating that the processing apparatus is abnormal. The light projection system with this structure enables the workers to recognize, at first glance, that the processing apparatus or a section of part thereof is abnormal and which part the abnormal processing apparatus or the section thereof actually corresponds to.

In the light projection system according to an aspect of the present invention, the projection controller may control the light emission unit such that at least one of presence/absence of projection of the light, a hue of the projected light, and blinking intervals of the projected light is changed. The light projection system with this structure effectively shows the workers which part the processing apparatus or the section thereof in the specific state actually corresponds to.

In the light projection system according to an aspect of the present invention, a production line may be formed, the production line including a combination weighing apparatus configured to weigh out articles to a predetermined weight and a box packing apparatus configured to pack a commodity containing the articles weighed out with the combination weighing apparatus in boxes, and the processing apparatus may include the box packing apparatus and the combination weighing apparatus. The light projection system with this structure enables the workers to recognize, at first glance, that a specific processing apparatus or a specific section thereof in the production line is in a specific state and which part the processing apparatus or the section thereof in the specific state actually corresponds to.

The combination weighing apparatus according to an aspect of the present invention comprises the light projection system described above; a conveying unit configured to convey articles; a plurality of hoppers configured to temporarily store therein the articles conveyed with the conveying unit; a weighing unit configured to weigh weighing values corresponding to masses of the articles stored in the respective hoppers; and a combination controller configured to select a combination of weighing values from the weighing values weighed with the weighing unit and associated with the respective hoppers such that a total value of the weighing values corresponds to a target weighing value, and configured to cause the hoppers corresponding to the combination to discharge the articles.

The combination weighing apparatus with this structure enables the workers to recognize, at first glance, that the combination weighing apparatus is in a specific state. In addition, when a plurality of combination weighing apparatuses are arranged, the combination weighing apparatus with this structure enables the workers to recognize, at first glance, which part the combination weighing apparatus in the specific state actually corresponds to.

In the combination weighing apparatus according to an aspect of the present invention, the light emission unit may be provided to be configured to selectively project the light on each of the hoppers, and the projection controller may control the mode of the light projected from the light emission unit such that the mode of the light reflected from the hopper is changed, on the basis of the state information. The combination weighing apparatus with this structure enables the workers to recognize, at first glance, that a specific hopper in the combination weighing apparatus is in a specific state and which part the hopper actually corresponds to.

Advantageous Effects of Invention

The aspect of the present invention enables the workers to recognize, at first glance, that the processing apparatus or a section in the processing apparatus is in a specific state and which part the processing apparatus or section in the specific state actually corresponds to.

DESCRIPTION OF EMBODIMENTS

Figure 1:
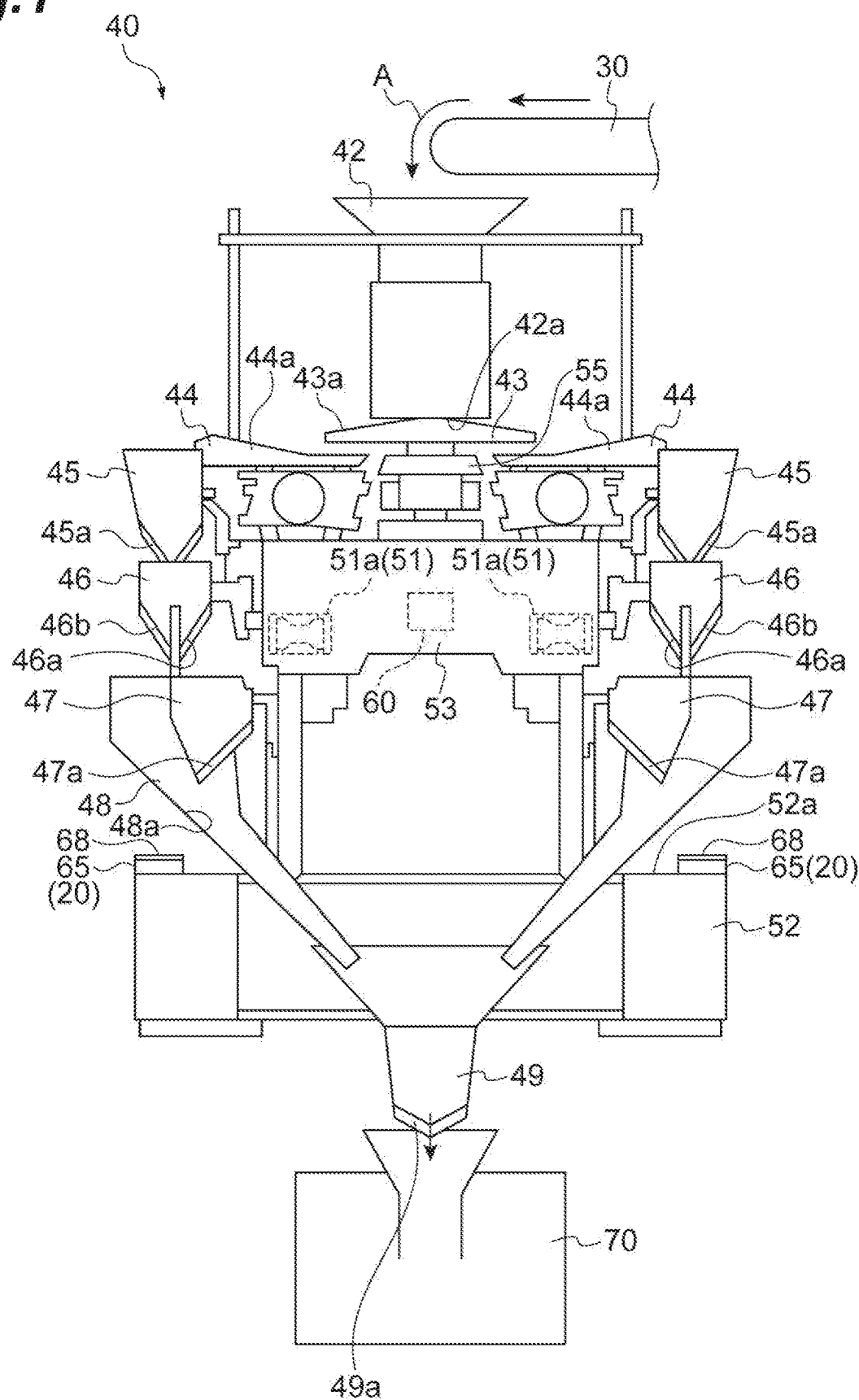
FIG. 1 is a diagram illustrating structure of a combination weighing apparatus according to a first embodiment.

The following is a detailed explanation of a preferred embodiment of an aspect of the present invention, with reference to attached drawings. In the explanation of the drawings, the same or corresponding elements are denoted by the same reference numerals, and an overlapping explanation thereof is omitted.

First Embodiment

Figure 2:
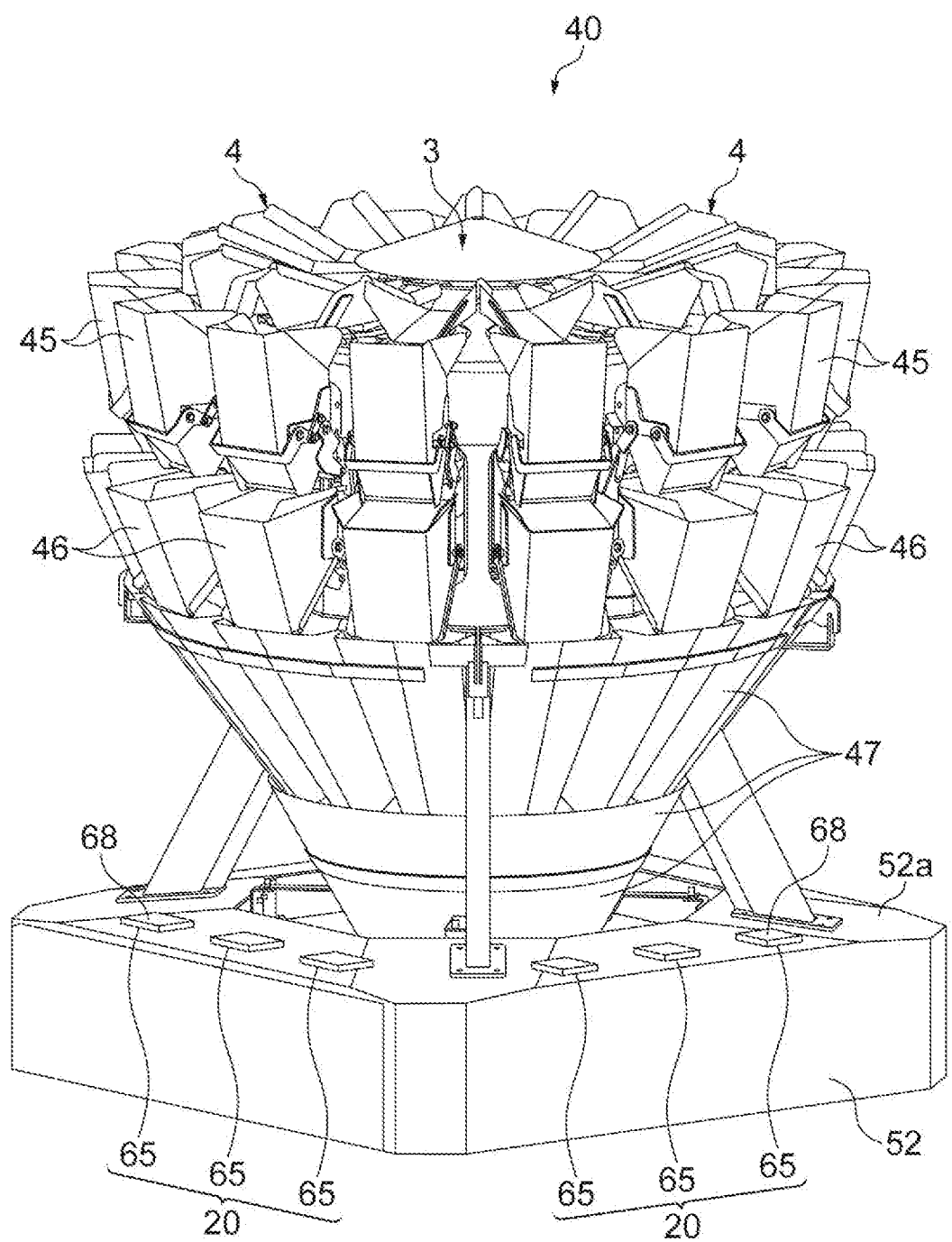
FIG. 2 is a perspective view of the combination weighing apparatus in FIG. 1.

As illustrated in FIG. 1 and FIG. 2, a combination weighing apparatus 40 includes an input shoot 42, a distributing table (conveyance unit) 43, a plurality of radial feeders 44, a plurality of pool hoppers 45, a plurality of weighing hoppers 46, a plurality of booster hoppers 47, a collecting shoot 48, a timing hopper 49, a weighing unit 51, a controller (combination controller) 60, and a light projection system 20. The combination weighing apparatus 40 weighs articles A supplied from a conveying apparatus 30 such that the articles A have a target weighing value, and supplies the articles A to a bag-making and packaging machine 70. The articles A are articles having variation in single mass, such as agricultural products, aquatic products, and food products. The bag-making and packaging machine 70 packages the articles weighed and supplied with the combination weighing apparatus 40 while forming a film into bags of a predetermined volume.

The input shoot 42 is disposed under a conveyance end of the conveying apparatus 30. The input shoot 42 is a cylindrical member having a hollow portion provided with openings at the top and the bottom thereof. The articles A falling from the conveyance end of the conveying apparatus 30 are put into the hollow portion of the input shoot 42. The articles A fallen into the hollow portion are discharged to the distributing table 43 through the bottom opening.

The distributing table 43 is disposed under the input shoot 42. The distributing table 43 has a conic conveying surface 43a widening downward. The distributing table 43 rotates the conveying surface 43a to uniformly convey the articles A discharged from the input shoot 42 to an apex portion of the conveying surface 43a toward the outer edge of the conveying surface 43a.

A driving unit 55 rotates the distributing table 43, with a central portion of the distributing table 43 serving as the center. An example of the driving unit 55 is a motor. The driving unit 55 intermittently rotates the distributing table 43. Specifically, the distributing table 43 repeats rotation and stopping.

The radial feeders 44 are radially arranged along the outer edge of the conveying surface 43a serving as the surface of the distributing table 43. Each of the radial feeders 44 includes a trough 44a extending from a part under the outer edge of the conveying surface 43a toward the outer edge. Each of the radial feeders 44 vibrates the trough 44a to convey the articles A discharged from the outer edge of the conveying surface 43a toward the distal end portion of the trough 44a.

The pool hoppers 45 are arranged under distal end portions of the troughs 44a of the respective radial feeders 44. A bottom portion of each of the pool hoppers 45 is provided with an openable/closable gate 45a. Each of the pool hoppers 45 temporarily stores, in a state of closing the gate 45a, the articles A discharged from the distal end portion of the corresponding trough 44a, and discharges the temporarily stored articles A downward by opening the gate 45a.

The weighing hoppers 46 are arranged under the gates 45a of the respective pool hoppers 45. A bottom portion of each of the weighing hoppers 46 is provided with openable/closable gate 46a and gate 46b. Each of the weighing hoppers 46 temporarily stores, in a state of closing the gate 46a and the gate 46b, the articles A discharged from the corresponding pool hopper 45, and discharges the temporarily stored articles A downward by opening the gate 46a and the gate 46b. The weighing hoppers 46 according to the first embodiment may be subjected to surface treatment such that the weighing hoppers 46 can easily reflect light projected from light emission units 65 described in details later. Examples of the surface treatment described above include coating, alumite treatment, and stainless plate pasting.

The booster hoppers 47 are arranged under the gates 46a of the respective weighing hoppers 46. A bottom portion of each of the booster hoppers 47 is provided with an openable/closable gate 47a.

Each of the booster hoppers 47 temporarily stores, in a state of closing the gate 47a, the articles A discharged from the gate 46a side of the corresponding weighing hopper 46, and discharges the temporarily stored articles A downward by opening the gate 47a.

The collecting shoot 48 is formed in a cylindrical shape having a truncated-conic internal surface 48a tapered downward. The collecting shoot 48 is disposed such that the internal surface 48a is disposed under all the weighing hoppers 46 and all the booster hoppers 47. The collecting shoot 48 receives, at the internal surface 48a, the articles A discharged from the gate 6b side of each of the weighing hoppers 46 and the articles A discharged from each of the booster hoppers 47, and discharges the articles A downward.

The timing hopper 49 is disposed under the collecting shoot 48. A bottom portion of the timing hopper 49 is provided with an openable/closable gate 49a. The timing hopper 49 temporarily stores, in a state of closing the gate 49a, the articles A discharged from the collecting shoot 48, and discharges the temporarily stored articles A to the bag-making and packaging machine 70 by opening the gate 49a.

The input shoot 42, the distributing table 43, the radial feeders 44, the pool hoppers 45, and the weighing hoppers 46 are directly or indirectly supported with a case 53. The booster hoppers 47, the collecting shoot 48, and the timing hopper 49 are directly or indirectly supported with a frame 52.

The weighing unit 51 is disposed in the case 53 supported with the frame 52. The weighing unit 51 includes a plurality of load cells 51a. The load cells 51a support the respective corresponding weighing hoppers 46. The weighing unit 51 weighs the weighing values corresponding to the corresponding masses of the articles A, while the articles A are temporarily stored in the respective weighing hoppers 46.

The controller 60 is disposed in the case 53. The controller 60 is a device controlling various operations in the combination weighing apparatus 40, and is a signal processing apparatus including a central processing unit (CPU), a read only memory (ROM), and/or a random access memory (RAM), and the like. The controller 60 controls operations of the units of the combination weighing apparatus 40, such as conveying operations of the distributing table 43 and each of the radial feeders 44, opening/closing operations of the gate 45a of each of the pool hoppers 45, opening/closing operations of the gate 46a and the gate 46b of each of the weighing hoppers 46, opening/closing operations of the gate 47a of each of the booster hoppers 47, and opening/closing operations of the gate 49a of each of the timing hoppers 49.

The controller 60 stores therein the weighing values weighed with the weighing unit 51 in association with the weighing hoppers 46 and/or the booster hoppers 47 storing therein the articles A corresponding to the respective weighing values. Specifically, when the articles A weighed with the weighing unit 51 are stored in the weighing hoppers 46, the controller 60 stores therein the weighing values weighed with the weighing unit 51 in association with the respective weighing hoppers 46 storing therein the articles A corresponding to the weighing values. When the articles A weighed with the weighing unit 51 are discharged to the booster hoppers 47 corresponding to the weighing hoppers 46, the controller 60 stores therein the weighing values of the articles A weighed with the weighing unit 51 in association with the booster hoppers 47 corresponding to the weighing hoppers 46.

The controller 60 selects a combination of weighing values from a plurality of weighing values weighed with the weighing unit 51 and associated with the weighing hoppers 46 and/or the booster hoppers 47 such that the total value corresponds to the target weighing value. Specifically, the controller 60 selects a combination of weighing values from a plurality of weighing values output from the weighing unit 51 such that the total value falls within a predetermined range including the target weighing value serving as the lower limit value. The controller 60 causes the weighing hoppers 46 and/or the booster hoppers 47 corresponding to the combination to discharge the articles A.

Figure 3:
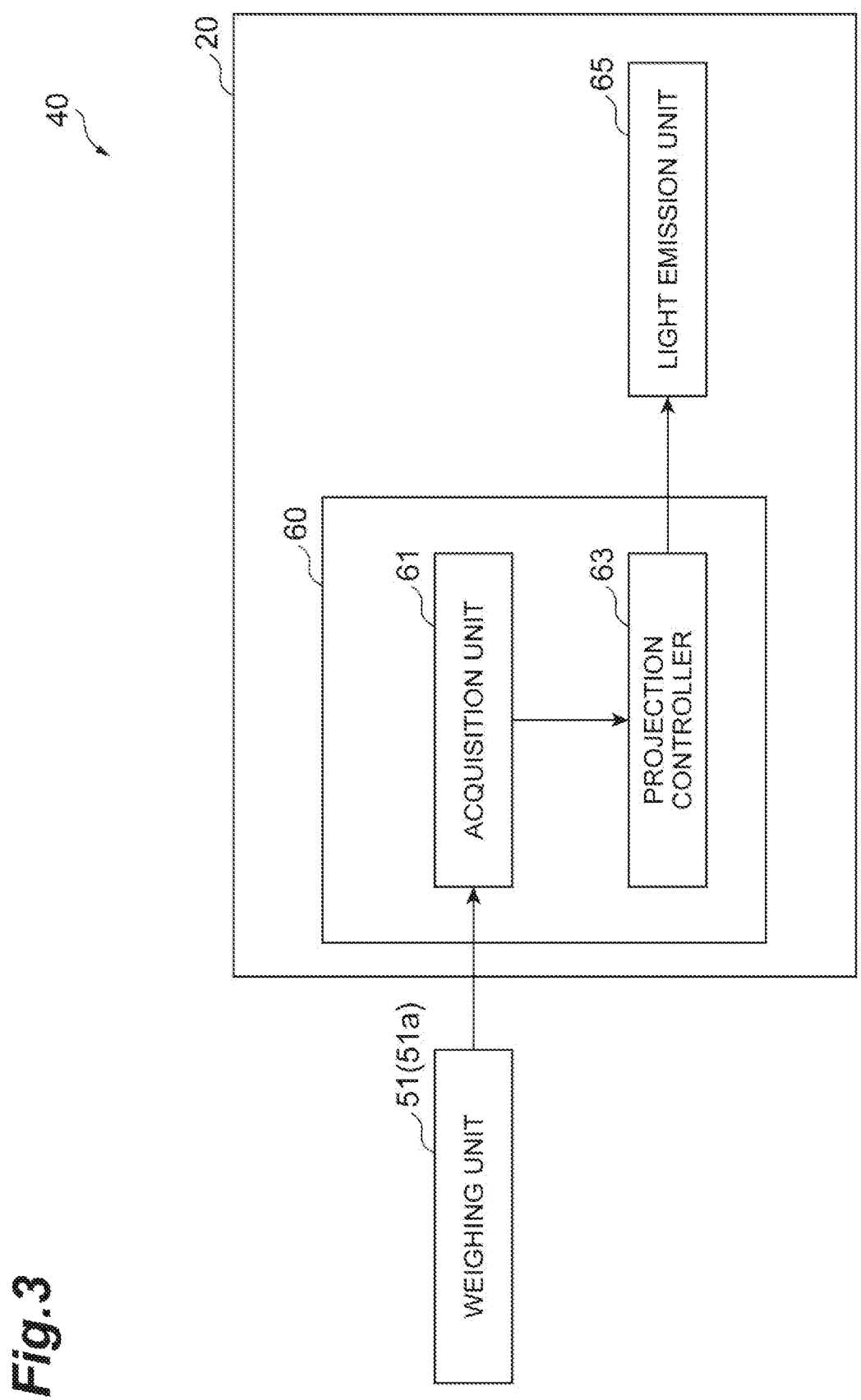
FIG. 3 is a functional block diagram of the combination weighing apparatus in FIG. 1.

The light projection system 20 is a light projection system capable of projecting light on each of the weighing hoppers 46 included in the combination weighing apparatus 40. As illustrated in FIG. 3, the light projection system 20 includes an acquisition unit 61, light emission units 65, and a projection controller 63. The acquisition unit 61 and the projection controller 63 are formed in the controller 60 by cooperation of hardware, such as the CPU, the ROM, and the RAM, and software, such as a computer program.

The acquisition unit 61 acquires, from each of the weighing units 51 (load cells 51a) corresponding to the respective weighing hoppers 46, state information indicating the state of the weighing hopper 46 in the combination weighing apparatus 40. The state information of each of the weighing hoppers 46 acquired with the acquisition unit 61 is information directly or indirectly indicating that the weighing hopper 46 is abnormal. In the first embodiment, the acquisition unit 61 acquires a weight value (resistance value) detected with the load cell 51a when the article A is discharged from the weighing hopper 46, to sense that the article A is not normally discharged from the weighing hopper 46 (presence/absence of discharge failure).

Presence/absence of discharge failure in the weighing hopper 46 can be acquired by, for example, detecting that a difference between the weight detected in advance with the load cell 51a when no article A is put into the weighing hopper 46 and the weight detected with the load cell 51a when the article A is discharged from the weighing hopper 46 exceeds a predetermined threshold.

Figure 4:
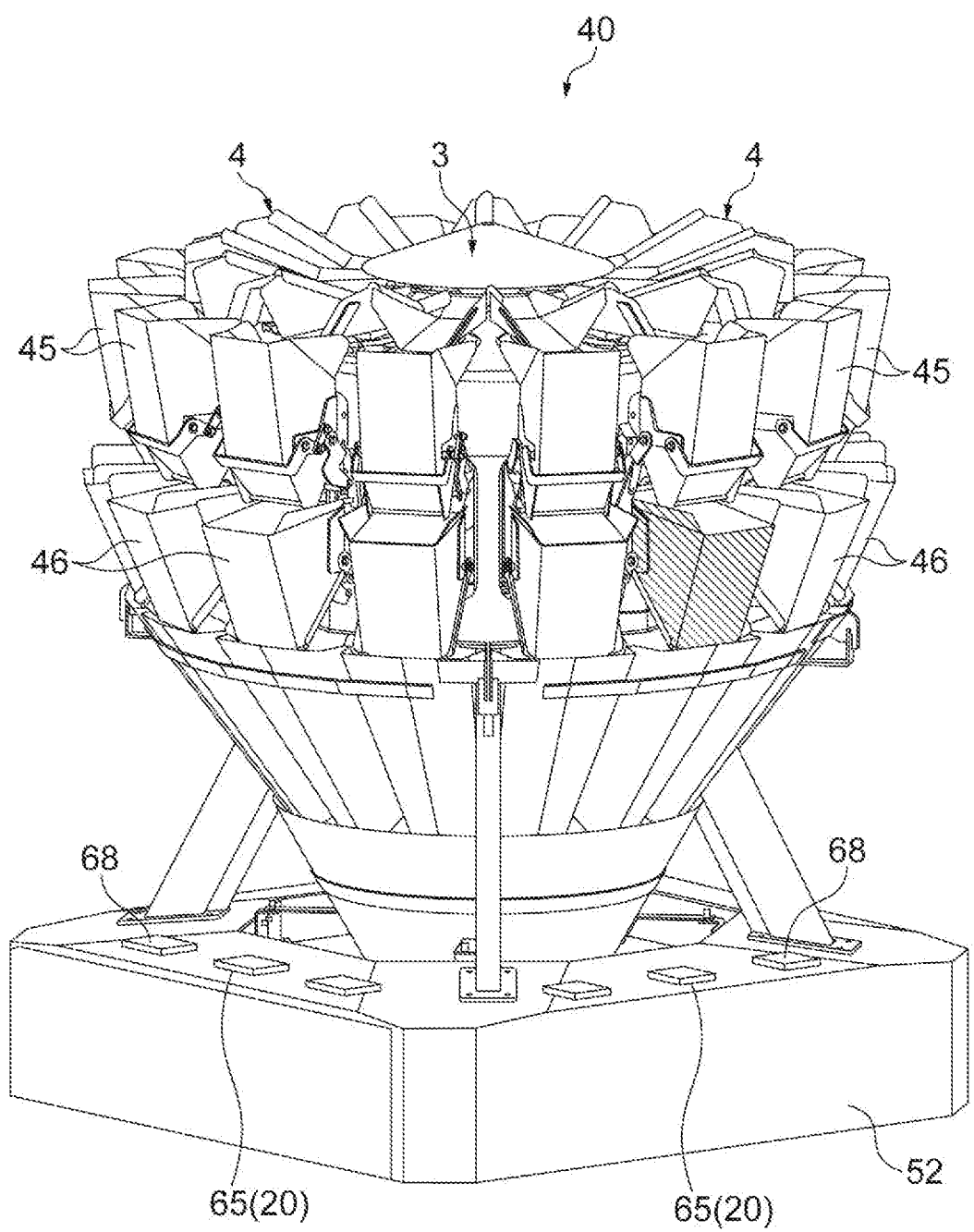
FIG. 4 is a perspective view illustrating a state in which a hopper in which abnormality has been sensed is projected with a light emission unit in the combination weighing apparatus in FIG. 1.

As illustrated in FIG. 4, the light emission units 65 are provided to correspond to the respective weighing hoppers 46 and to be capable of projecting light on the respective weighing hoppers 46. The light emission units 65 are arranged on an upper surface 52a of the frame 52, and project light toward the weighing hoppers 46 provided above the light emission units 65. Specifically, the light emission units 65 perform light projection upward from positions under the weighing hoppers 46. Examples of the light emission units 65 include light emitting diode (LED) lamps, incandescent lamps, halogen lamps, fluorescent lamps, high-intensity discharge (HID) lamps, and mercury lamps. The light emission units 65 are capable of changing at least one of presence/absence of light projection, a hue of the projected light, and blinking (flickering) intervals of the projected light, and these are controlled with the projection controller 63. A diffusion plate 68 is provided on an emission surface of each of the light emission units 65. This structure broadens the projection area of light projected from each of the light emission units 65, and enables substantially uniform light projection on the surface of each of the weighing hoppers 46 serving as the target.

The projection controller 63 illustrated in FIG. 3 controls the mode of light projected from each of the light emission units 65 such that the mode of light reflected with each of the weighing hoppers 46 is changed, on the basis of the state information acquired with the acquisition unit 61. The projection controller 63 controls each of the light emission units 65 such that at least one of presence/absence of light projection, a hue of the projected light, and blinking intervals of the projected light. In the first embodiment, the projection controller 63 determines whether any discharge failure has occurred in the weighing hopper 46, on the basis of state information (weight value indicated with the load cell 51a after discharge of the article) acquired with the acquisition unit 61. When the projection controller 63 determines that discharge failure has occurred in the weighing hopper 46, the projection controller 63 controls the light emission units 65 such that the weighing hopper 46 in which discharge failure has occurred reflects light of a specific color (such as a red color).

In the combination weighing apparatus 40 according to the first embodiment described above, as illustrated in FIG. 4, the light reflected from the weighing hopper 46 in which discharge failure has occurred has a specific color (such as a red color). For this reason, the combination weighing apparatus 40 enables the workers to recognize, at first glance, that the weighing hopper 46 in the combination weighing apparatus 40 is in a discharge failure state and which weighing hopper the weighing hopper 46 actually corresponds to. In addition, in the case where a plurality of the combination weighing apparatuses 40 according to the first embodiment described above are provided in a factory, this structure enables the workers to recognize, at first glance, which weighing hopper 46 in the combination weighing apparatus 40 has incurred discharge failure.

The projection controller 63 in the combination weighing apparatus 40 according to the first embodiment described above controls the light emission units 65 to cause the weighing hopper 46 to reflect red light having a hue different from that of room illumination. This structure enables the workers to easily recognize the abnormal weighing hopper 46.

The first embodiment has been explained as described above, but the first embodiment can be variously changed. The first embodiment described above illustrates the example in which the light emission units 65 are arranged in the same number as that of the weighing hoppers 46 to correspond to the weighing hoppers 46, as illustrated in FIG. 2. However, the first embodiment may have a structure of providing one or a plurality of light emission units each capable of selectively projecting light on a plurality of weighing hoppers 46.

In addition, the first embodiment described above illustrates the example in which, when discharge failure has occurred in the weighing hopper 46, the projection controller 63 controls light projection of the light emission units 65 such that red light is reflected. However, for example, light projection of the light emission units 65 may be controlled such that green or blue light is reflected. As another example, the projection controller 63 may control the light emission units 65 such that light reflection intensity increases as the degree of discharge failure increases. As another example, the projection controller 63 may control light projection of the light emission units 65 such that light reflected from the weighing hopper 46 flickers.

The first embodiments described above illustrates the structure in which the acquisition unit 61 acquires state information for each of the weighing hoppers 46 and light can be reflected from each of abnormal weighing hoppers 46, as an example. However, for example, the acquisition unit 61 may acquire state information for each of combination weighing apparatuses 40, and the projection controller 63 may control the light emission units 65 such that light is reflected from each of abnormal combination weighing apparatuses 40. In this case, the first embodiment may have a structure in which light of a specific color can be reflected from each of the relevant combination weighing apparatuses 40 when the operating rate of the combination weighing apparatus 40 becomes lower than a predetermined threshold, as well as in the case where abnormality has occurred in the combination weighing apparatus 40. As another example, the projection controller 63 may control the light emission units 65 to cause the combination weighing apparatus 40 or the weighing hopper 46 or the like to reflect a specific color, for example, when the gate 45a, 46a, or 47a in the pool hopper 45, the weighing hopper 46, or the booster hopper 47 has a malfunction, and/or unbalance supply to the booster hopper 47 has occurred, as well as when discharge failure has occurred in a weighing hopper 46. In this case, the projection controller 63 may control light projection of the light emission units 65 such that the modes of light are mutually different between the events described above.

Second Embodiment

Figure 5:
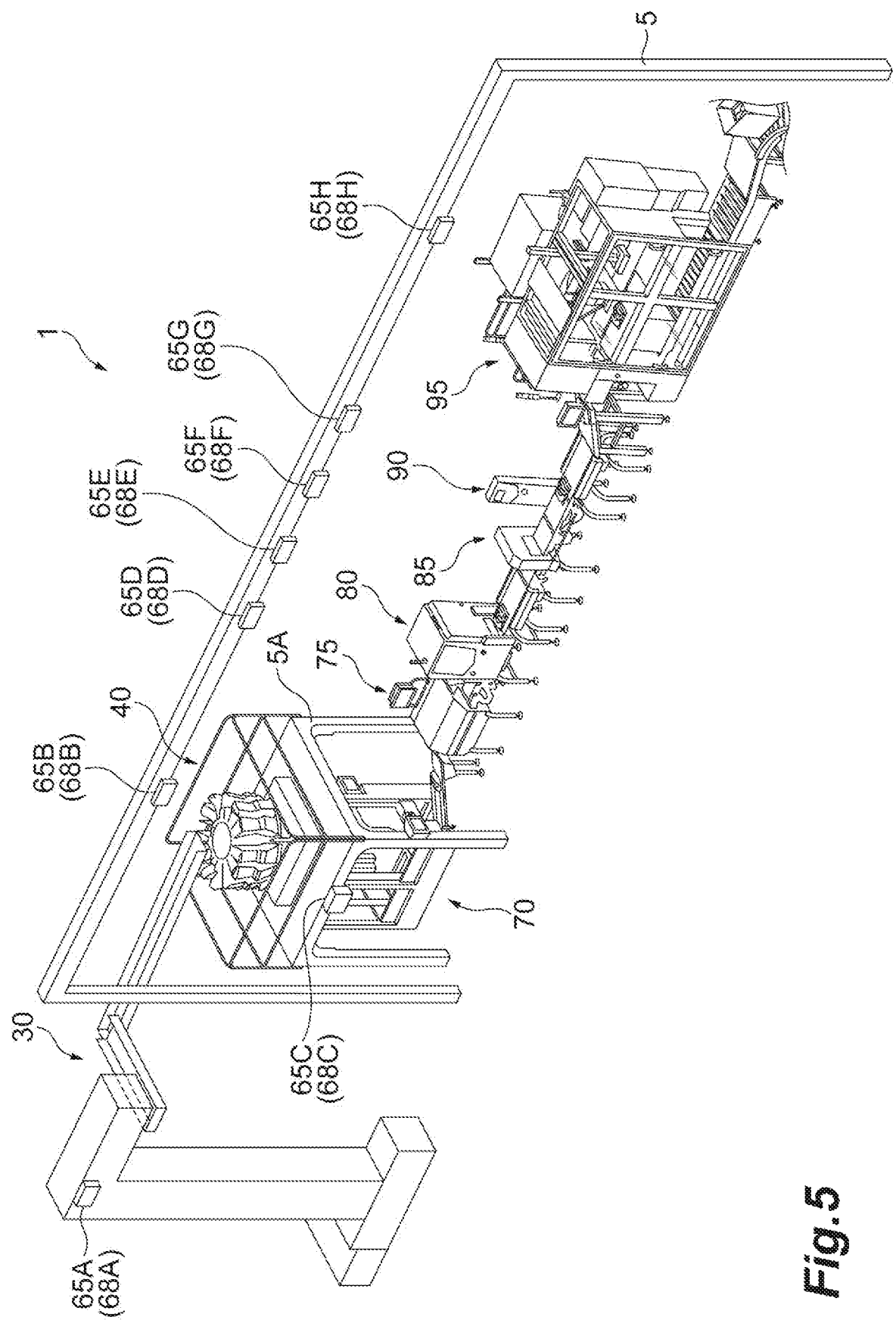
FIG. 5 is a perspective view illustrating the whole production line according to a second embodiment.

The first embodiment described above illustrates the example in which the light projection system 20A is incorporated in the combination weighing apparatus 40, but the structure is not limited thereto. For example, as illustrated in FIG. 5, the light projection system 20A may be applied to a projection line 1 including the conveying apparatus 30, the combination weighing apparatus 40, the bag-making and packaging machine 70, a seal inspection apparatus 75, an X-ray inspection apparatus 80, a metal detecting apparatus 85, a weight inspection apparatus 90, and/or a box packing apparatus 95. The following is a brief explanation of each of the processing apparatuses.

The conveying apparatus 30 conveys articles A from the supply unit to the combination weighing apparatus 40, and supplies the articles A to the input shoot 42 of the combination weighing apparatus 40. The combination weighing apparatus 40 is a apparatus weighing out the articles A to a predetermined weight. The details thereof are the same as those of the first embodiment described above. The bag-making and packaging machine 70 packages the articles A weighed out with the combination weighing apparatus 40 while making bags to package the articles A. The seal inspection apparatus 75 senses abnormality of the bags made and packaged with the bag-making and packaging machine 70. The X-ray inspection apparatus 80 inspects the state of the articles A contained in the bags or presence/absence of foreign matters mixed in the articles A. The metal detecting apparatus 85 inspects presence/absence of metal mixed into the articles A contained in the bags. The weight inspection apparatus 90 inspects the weight of a commodity containing the articles A. The box packing apparatus 95 packs the commodity in corrugated cardboard boxes.

The production line 1 including such processing apparatuses performs a series of processes including weighing, packaging, inspection, and boxing of the articles A. Thereafter, the conveying apparatus 30, the combination weighing apparatus 40, the bag-making and packaging machine 70, the seal inspection apparatus 75, the X-ray inspection apparatus 80, the metal detecting apparatus 85, the weight inspection apparatus 90, and the box packing apparatus 95 are simply referred to as "processing apparatuses" together. Each of the various processing apparatuses includes a controller (not illustrated) including a CPU, a ROM, a RAM, and the like, and controlling various operations in the various processing apparatuses. Each of the controllers according to the second embodiment senses that abnormality has occurred in the processing apparatus, and outputs information thereof to an acquisition unit 61A of a light projection system 20A illustrated in FIG. 6 described later.

Figure 6:
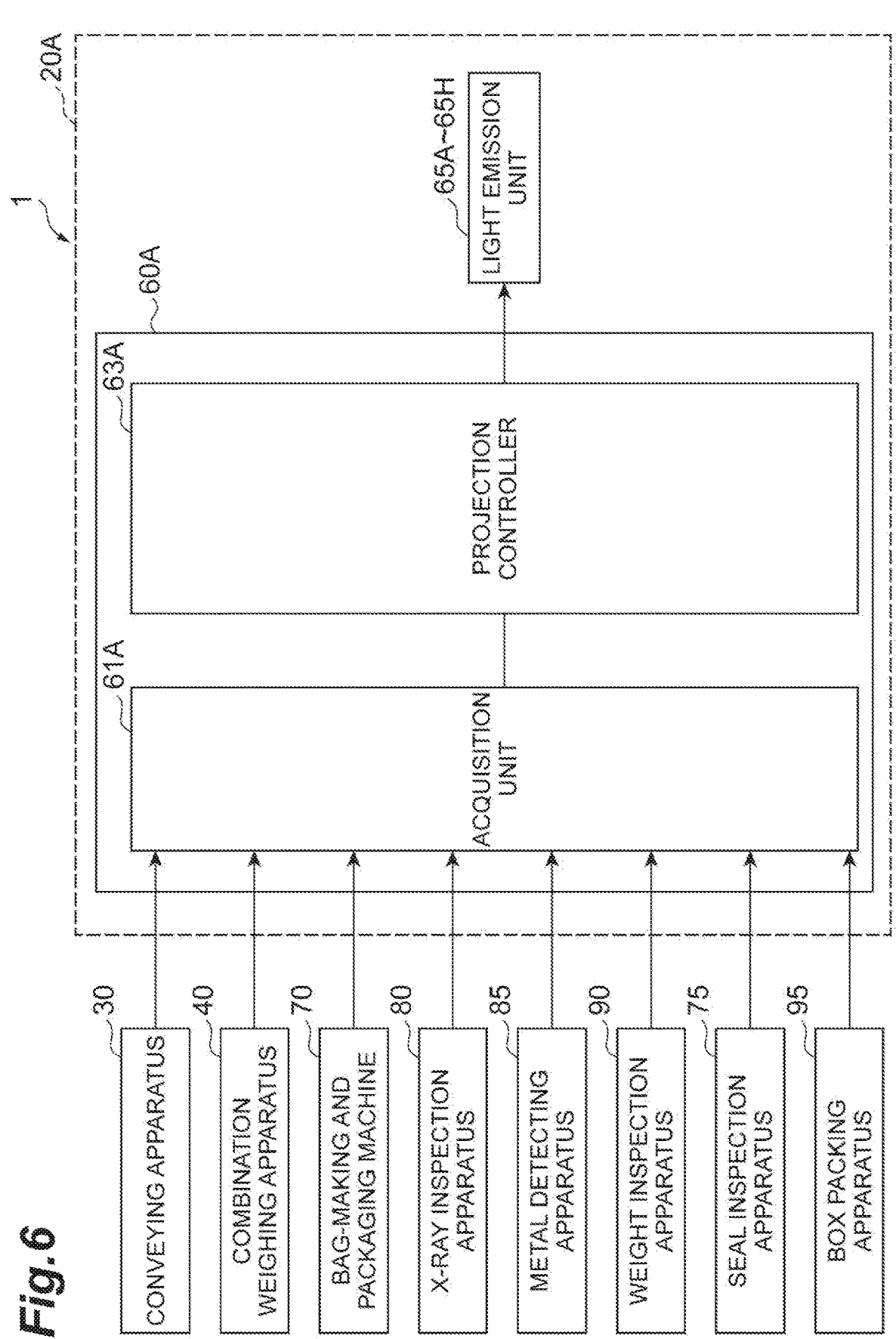
FIG. 6 is a functional block diagram of the production line in FIG. 5.

The light projection system 20A is a system projecting light to each of the processing apparatuses forming the production line 1 installed in a factory as described above. As illustrated in FIG. 6, the light projection system 20A includes a controller 60A and light emission units 65A to 65H. The controller 60A includes a CPU, a ROM, a RAM, and the like, and control various operations in the light projection system 20A. The controller 60A also includes an acquisition unit 61A and a projection controller 63A. The acquisition unit 61A and the projection controller 63A is formed in the controller 60A by cooperation of hardware, such as the CPU, the ROM, the RAM, and the like, and software, such as a computer program. The controller 60A may be disposed in an administration office in a corner of the factory in which the production line 1 is installed, may be disposed in one of the processing apparatuses forming the production line 1, or may be disposed in a server device or the like disposed in a place different from the factory and allowing communication with the factory through a network.

The acquisition unit 61A acquires, from each of the processing apparatuses, state information indicating the state of the processing apparatus. In the second embodiment, the acquisition unit 61A is provided to be capable of communicating with the controller included in each of the processing apparatuses in a wired or wireless manner. The acquisition unit 61A acquires information indicating presence/absence of occurrence of abnormality from each of the processing apparatuses.

The light emission units 65A to 65H are provided to correspond to the conveying apparatus 30, the combination weighing apparatus 40, the bag-making and packaging machine 70, the seal inspection apparatus 75, the X-ray inspection apparatus 80, the metal detecting apparatus 85, the weight inspection apparatus 90, and the box packing apparatus 95. The light emission units 65A to 65H are provided to be capable of projecting light to the respective processing apparatuses. The light emission units 65A to 65H are provided, for example, above the respective processing apparatuses. Specifically, as illustrated in FIG. 5, the light emission unit 65A is fixed in an upper portion of the conveying apparatus 30, each of the light emission unit 65B and the light emission units 65D to 65H is fixed on a support frame 5, and the light emission unit C is fixed on a support frame 5A supporting the combination weighing apparatus 40.

The light emission units 65A to 65H are capable of changing at least one of presence/absence of light projection, a hue of the projected light, and blinking intervals of the projected light, in the same manner as the light emission unit 65, and these are controlled with the projection controller 63A. Diffusion plates 68A to 68H are provided on emission surfaces of the light emission units 65A to 65H, respectively. This structure broadens the projection area of light projected from each of the light emission units 65A to 65H, and enables substantially uniform light projection on the whole surface of each of the processing apparatuses serving as the target.

The projection controller 63A controls the mode of light projected from each of the light emission units 65A to 65H such that the mode of light reflected with each of the processing apparatuses is changed, on the basis of the state information of each of the processing apparatuses. In the present embodiment, when information indicating that abnormality has occurred in the processing apparatus is acquired, the projection controller 63A causes the light emission units 65A to 65H to project light of a specific color (for example, a red color) such that light of the specific color (for example, a red color) is reflected in the processing apparatus in which abnormality has occurred. For example, when information indicating that abnormality has occurred in the combination weighing apparatus 40 and the box packing apparatus 95 is acquired, the projection controller 63A causes the light emission unit 65B and the light emission unit 65H to project light of a specific color (red color) such that light of the specific color (red color) is reflected in the combination weighing apparatus 40 and the box packing apparatus 95.

Figure 7:
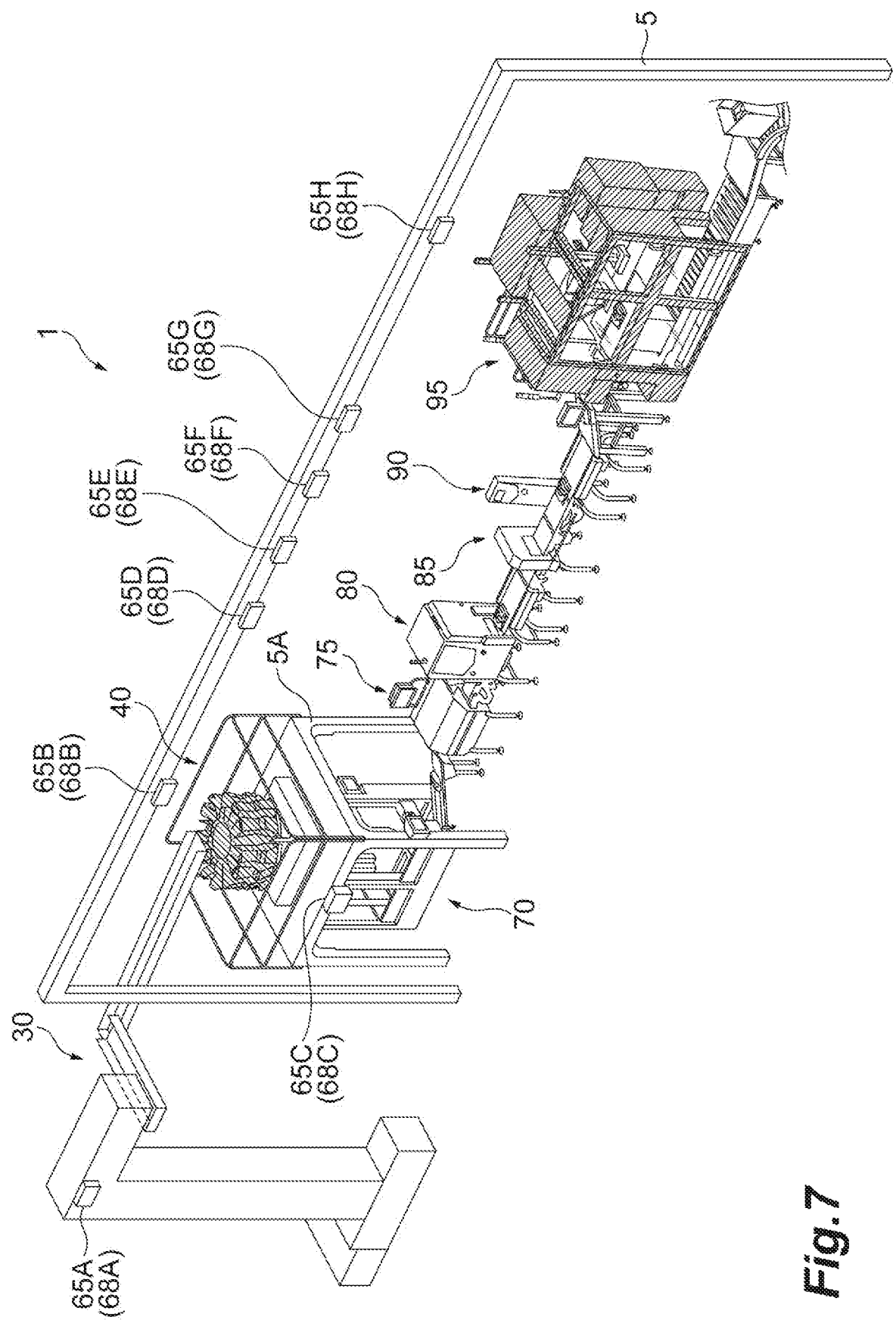
FIG. 7 is a perspective view illustrating a state in which a box packing apparatus in which abnormality has been sensed in the production line in FIG. 5 is light-projected with a light emission unit.

In the production line 1 according to the second embodiment, light reflected from the processing apparatus in which abnormality has occurred has a specific color (for example, a red color). For example, as illustrated in FIG. 7, when abnormality has occurred in the box packing apparatus 95 in the production line 1, light reflected from the box packing apparatus 95 has a specific color (for example, a red color). This structure enables the workers to recognize, at first glance, that abnormality has occurred in the processing apparatus in the production line 1 and which part the processing apparatus actually corresponds to.

In addition, the light projection system 20A according to the second embodiment notifies the workers of occurrence of abnormality in the processing apparatus, with the whole surface of the processing apparatus changed to the specific color. This structure reduces the area serving as a blind spot for the worker in comparison with, for example, the case of notifying the workers of occurrence of abnormality in the processing apparatus with lighting of a sign ball.

The light projection system 20A according to the second embodiment controls the light emission units 65A to 65H such that light of red color having a hue different from that of room illumination is reflected, and enables the workers to easily recognize the processing apparatus in which abnormality has occurred.

The second embodiment has been explained as described above, but the second embodiment can be variously changed. For example, the second embodiment has illustrated the example in which the light emission units 65A to 65H are arranged in the same number as that of processing apparatuses to correspond to the processing apparatuses, as illustrated in FIG. 7. However, the second embodiment may have the structure of providing one or a plurality of light emission units each capable of selectively projecting light on a plurality of processing apparatuses, in the same manner as the first embodiment.

In addition, the second embodiment described above has illustrated the example in which, when abnormality occurs in the processing apparatus, the projection controller 63A controls light projection of the light emission units 65A to 65H such that red light is reflected. However, for example, the projection controller 63A may control the light emission units 65A to 65H such that green or blue light is reflected, as in the first embodiment. As another example, the projection controller 63A may control the light emission units 65A to 65H such that light reflection intensity increases as the degree of abnormality increases. As another example, the projection controller 63A may control the light emission units 65A to 65H such that light reflected from the processing apparatus blinks.

The second embodiment described above has illustrated the structure in which the acquisition unit 61A is provided to acquire state information for each of the processing apparatus and light can be reflected from each of the processing apparatuses in which abnormality has occurred, as an example. However, for example, the acquisition unit 61A may acquire presence/absence (state information) of abnormality as the production line 1, and the projection controller 63A may control the light emission units 65A to 65H such that all the processing apparatuses forming the production line 1 reflect red light when abnormality occurs in the production line 1. In this case, the second embodiment may have the structure in which light of a specific color can be reflected from each of the relevant production lines 1, when the operating rate of the production line 1 becomes lower than the predetermined threshold, as well as in the case where abnormality has occurred in the production line 1. As another example, the projection controller 63A may control the light emission units 65A to 65H such that light is reflected from each of the sections (for example, the weighing hopper 46 in the combination weighing apparatus 40) of the processing apparatus in which abnormality has occurred, when abnormality has occurred in the section in one processing apparatus, as well as in the case where abnormality has occurred in one processing apparatus, as in the first embodiment. In this case, the projection controller 63A may control light projection of the light emission units 65A to 65H such that the modes of light are mutually different between the events described above.

Third Embodiment

Figure 8:
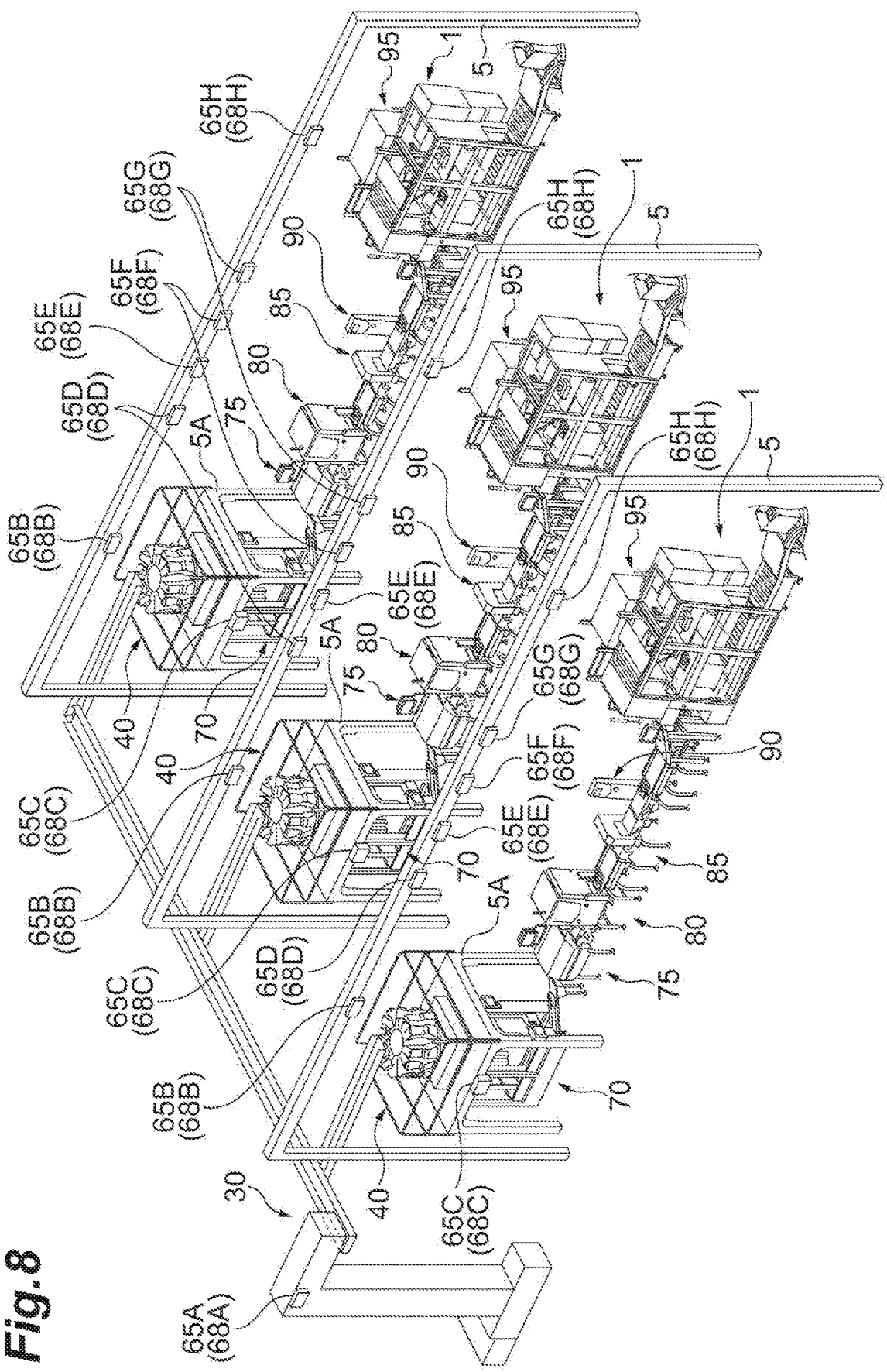
FIG. 8 is a perspective view illustrating the whole projection line according to a third embodiment.

The light projection system 20A according to the second embodiment described above has been explained with an example in which the light projection system 20A is provided in a factory or the like provided with one production line 1, but the structure is not limited thereto. For example, as illustrated in FIG. 8, the light projection system 20A may be provided in a factory or the like provided with a plurality of (for example, three) production lines 1 explained as the second embodiment. The light projection system 20A in this case serves as a system projecting light to each of a plurality of processing apparatuses forming the respective production lines 1. The structure of the light projection system 20A is the same as that of the second embodiment, and a detailed explanation thereof is omitted herein.

In the production lines 1, 1, and 1 according to the third embodiment described above, light reflected from the processing apparatus in which abnormality has occurred has a specific color (for example, a red color), in the same manner as the second embodiment. For example, when abnormality has occurred in the box packing apparatus 95 in the production line 1, light reflected from the box packing apparatus 95 has a specific color (for example, a red color). This structure enables the workers to recognize, at first glance, that abnormality has occurred in the processing apparatus in the production line 1 and which part the processing apparatus actually corresponds to.

In addition, in the light projection system 20A according to the third embodiment, notifies the workers of occurrence of abnormality in the processing apparatus, with the whole surface of the processing apparatus changed to the specific color, in the same manner as the second embodiment. This structure reduces the area serving as a blind spot for the worker in comparison with, for example, the case of notifying the workers of occurrence of abnormality in the processing apparatus with lighting of a sign ball. Besides, the light projection system 20A according to the third embodiment controls the light emission units 65A to 65H such that light of red color having a hue different from that of room illumination is reflected, and enables the workers to easily recognize the processing apparatus in which abnormality has occurred.

Figure 9:
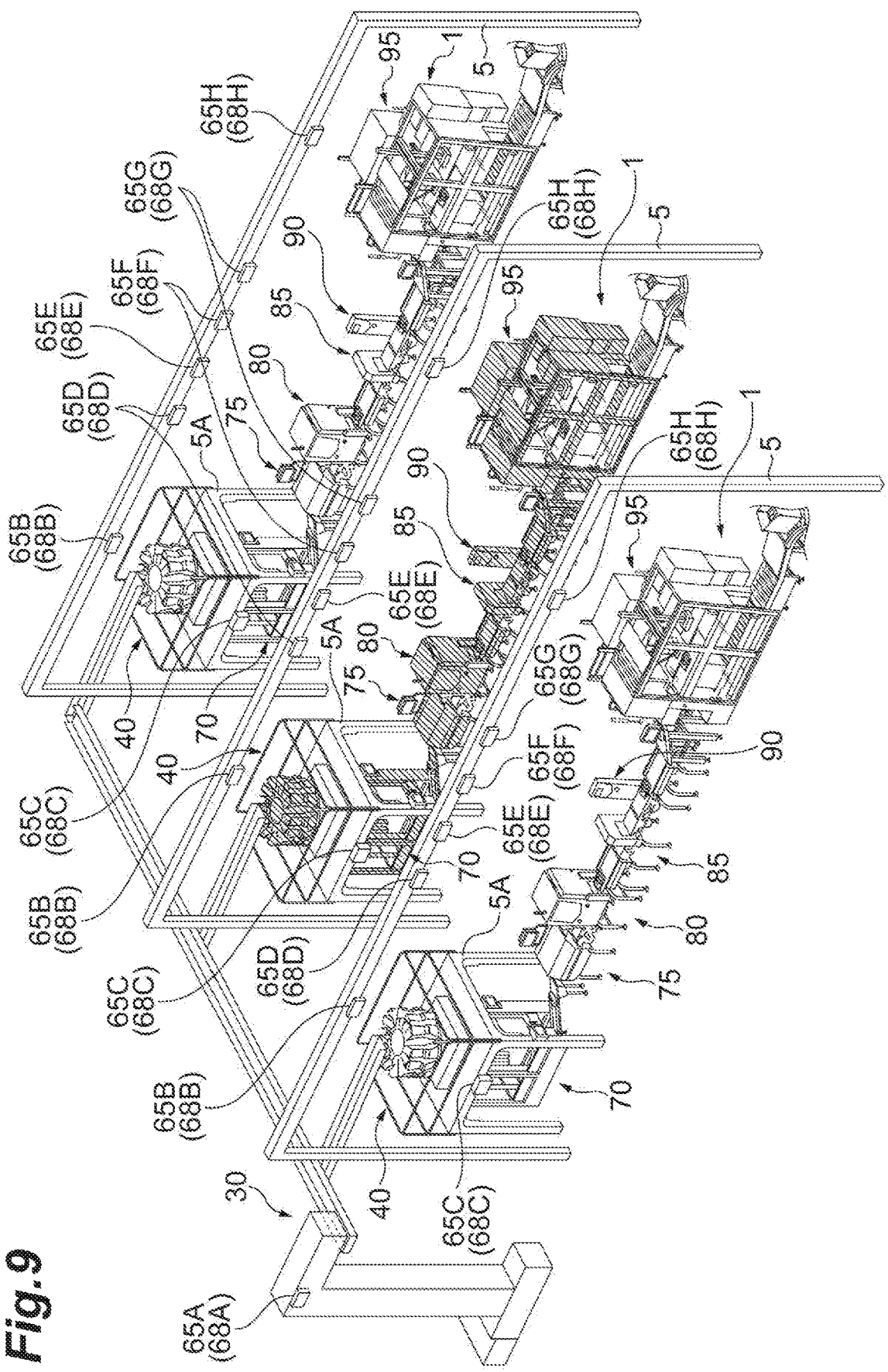
FIG. 9 is a perspective view illustrating a state in which a production line set in which abnormality has been sensed in the production line in FIG. 8 is light-projected with a light emission unit.

The third embodiment has been explained as described above, but the third embodiment can be variously changed. The third embodiment described above can also be modified like the modification described in the second embodiment described above. In addition, the third embodiment described above has illustrated the structure in which the acquisition unit 61A is configured to acquire presence/absence of abnormality for each of the processing apparatuses such that light can be reflected from each of the processing apparatuses, in which abnormality has occurred, as an example. However, the acquisition unit 61A may acquire state information for each of the production lines 1, and the projection controller 63A may control the light emission units 65A to 65H such that light is reflected from all the processing apparatuses forming the production line 1 in which abnormality has occurred, as illustrated in FIG. 9. In this case, the third embodiment may have the structure in which light of a specific color can be reflected from each of the relevant production lines 1, when the operating rate of the production line 1 becomes lower than the predetermined threshold, as well as in the case where abnormality has occurred in the production line 1.

The first, the second, and the third embodiments have been explained as described above, but an aspect of the present invention is not limited to the embodiments described above. Various changes may be made within a range not departing from the gist of the aspect of the invention.

The first, the second, and the third embodiments have illustrated the example in which red light is reflected in the processing apparatuses forming the combination weighing apparatus 40 or the production line 1 only when abnormality has occurred in the combination weighing apparatus 40 or the production line 1. However, the structure is not limited thereto. For example, when the combination weighing apparatus 40, each of the processing apparatuses forming the production line 1, or the production line 1 is normal (favorable), the projection controller 63 (63A) may control light projection of the light emission unit 65 (65A to 65H) such that blue or green light is reflected in the combination weighing apparatus 40, in the processing apparatuses forming the production line 1 or over the whole production line 1. As another example, when the combination weighing apparatus 40, each of the processing apparatuses forming the production line 1, or the production line 1 is in a state (of insufficiency in material supply, error warning) before abnormality occurs, the projection controller 63 (63A) may control light projection of the light emission unit 65 (65A to 65H) such that yellow or orange light is reflected in the combination weighing apparatus 40, in the processing apparatuses foaming the production line 1, or over the whole production line 1. As another example, when the combination weighing apparatus 40, each of the processing apparatuses forming the production line 1 or the production line 1 is in a state (stopping due to error or stopping due to malfunction) in which abnormality has occurred, the projection controller 63 (63A) may control light projection of the light emission unit 65 (65A to 65H) such that red light is reflected in the combination weighing apparatus 40, in the processing apparatuses forming the production line 1 or over the whole production line 1.

The light emission units according to the embodiments or the modification described above have been explained with the example in which the light emission units are arranged to project light on the whole or part of the processing apparatus from the outside (exterior) of the processing apparatus serving as the target. However, the structure is not limited thereto. For example, each of the light emission units may be disposed inside (interior) the processing apparatus serving as the target, or disposed in a position similar to the components forming the processing apparatus, to project light on the whole or part of the processing apparatus. In addition, in this case, each of the light emission units may indirectly project light on the whole or part of the processing apparatus via a diffusion plate and/or a reflection plate, instead of directly projecting light on the whole or part of the processing apparatus.

The embodiments and the modification described above have illustrated examples of illumination, such as LED lamps, as examples of the light emission units 65 (65A to 65H) enabling reflection of light of a specific color in the combination weighing apparatus 40, each of the processing apparatuses forming the production line 1, or the production line 1. However, the structure is not limited thereto. For example, a projector (movie projector) used for projection mapping may be used, instead of illumination, such as LED lamps.

Reference Signs List

1 . . . PRODUCTION LINE, 20, 20A . . . LIGHT PROJECTION SYSTEM, 30 . . . CONVEYING APPARATUS (PROCESSING APPARATUS), 40 . . . COMBINATION WEIGHING APPARATUS (PROCESSING APPARATUS), 46 . . . WEIGHING HOPPER, 60 . . . CONTROLLER (COMBINATION CONTROLLER), 60A . . . CONTROLLER, 61, 61A . . . ACQUISITION UNIT, 63, 63A . . . PROJECTION CONTROLLER, 65, 65A TO 65H . . . LIGHT EMISSION UNIT, 70 . . . BAG-MAKING AND PACKAGING MACHINE (PROCESSING APPARATUS), 75 . . . SEAL INSPECTION APPARATUS (PROCESSING APPARATUS), 80 . . . X-RAY INSPECTION APPARATUS (PROCESSING APPARATUS), 85 . . . METAL DETECTING APPARATUS (PROCESSING APPARATUS), 90 . . . WEIGHT INSPECTION APPARATUS (PROCESSING APPARATUS), 95 . . . BOX PACKING APPARATUS (PROCESSING APPARATUS).

The invention claimed is:

1. A light projection system projecting light on a processing apparatus or a plurality of processing apparatuses installed in a factory, comprising:
   an acquisition unit configured to acquire, from the processing apparatus or each of the processing apparatuses, state information indicating a state of the processing apparatus;
   a light emission unit configured to project the light on the processing apparatus or each of the processing apparatuses; and
   a projection controller configured to control a mode of the light projected from the light emission unit from outside of the processing apparatus toward all or part of the processing apparatus such that the mode of the light reflected from the processing apparatus is changed, on the basis of the state information.

2. The light projection system according to claim 1, wherein
   the acquisition unit acquires the state information from the processing apparatuses on an individual basis, and
   the light emission unit is provided to be configured to project light on whole or part of the processing apparatus.

3. The light projection system according to claim 1, wherein
   the acquisition unit acquires the state information from the processing apparatus on a part-specific basis; and
   the light emission unit is provided to be configured to project light on the processing apparatus on a part-specific basis.

4. The light projection system according to claim 1, wherein the state information acquired with the acquisition unit is information indicating that the processing apparatus is abnormal.

5. The light projection system according to claim 1, wherein the projection controller controls the light emission unit such that at least one of presence/absence of projection of the light, a hue of the projected light, and blinking intervals of the projected light is changed.

6. The light projection system according to claim 1, wherein
a production line is formed, the production line including a combination weighing apparatus configured to weigh out articles to a predetermined weight and a box packing apparatus configured to pack a commodity containing the articles weighed out with the combination weighing apparatus in boxes, wherein
the processing apparatus includes the box packing apparatus and the combination weighing apparatus.

7. A combination weighing apparatus comprising:
the light projection system according to claim 1;
a conveying unit configured to convey articles;
a plurality of hoppers configured to temporarily store therein the articles conveyed with the conveying unit;
a weighing unit configured to weight weighing values corresponding to masses of the articles stored in the respective hoppers; and
a combination controller configured to select a combination of the weighing values from the weighing values weighed with the weighing unit and associated with the respective hoppers such that a total value of the weighing values corresponds to a target weighing value, and configured to cause the hoppers corresponding to the combination to discharge the articles.

8. The combination weighing apparatus according to claim 7, wherein
the light emission unit is provided to be configured to selectively project the light on each of the hoppers, and
the projection controller controls the mode of the light projected from the light emission unit such that the mode of the light reflected from the hopper is changed, on the basis of the state information.

9. The light projection system according to claim 2, wherein the state information acquired with the acquisition unit is information indicating that the processing apparatus is abnormal.

10. The light projection system according to claim 3, wherein the state information acquired with the acquisition unit is information indicating that the processing apparatus is abnormal.

11. The light projection system according to claim 2, wherein the projection controller controls the light emission unit such that at least one of presence/absence of projection of the light, a hue of the projected light, and blinking intervals of the projected light is changed.

12. The light projection system according to claim 3, wherein the projection controller controls the light emission unit such that at least one of presence/absence of projection of the light, a hue of the projected light, and blinking intervals of the projected light is changed.

13. The light projection system according to claim 2, wherein
a production line is formed, the production line including a combination weighing apparatus configured to weigh out articles to a predetermined weight and a box packing apparatus configured to pack a commodity containing the articles weighed out with the combination weighing apparatus in boxes, wherein
the processing apparatus includes the box packing apparatus and the combination weighing apparatus.

14. The light projection system according to claim 3, wherein
a production line is formed, the production line including a combination weighing apparatus configured to weigh out articles to a predetermined weight and a box packing apparatus configured to pack a commodity containing the articles weighed out with the combination weighing apparatus in boxes, wherein
the processing apparatus includes the box packing apparatus and the combination weighing apparatus.

15. A combination weighing apparatus comprising:
the light projection system according to claim 2;
a conveying unit configured to convey articles;
a plurality of hoppers configured to temporarily store therein the articles conveyed with the conveying unit;
a weighing unit configured to weigh weighing values corresponding to masses of the articles stored in the respective hoppers; and
a combination controller configured to select a combination of the weighing values from the weighing values weighed with the weighing unit and associated with the respective hoppers such that a total value of the weighing values corresponds to a target weighing value, and configured to cause the hoppers corresponding to the combination to discharge the articles.

16. A combination weighing apparatus comprising:
the light projection system according to claim 3;
a conveying unit configured to convey articles;
a plurality of hoppers configured to temporarily store therein the articles conveyed with the conveying unit;
a weighing unit configured to weigh weighing values corresponding to masses of the articles stored in the respective hoppers; and
a combination controller configured to select a combination of the weighing values from the weighing values weighed with the weighing unit and associated with the respective hoppers such that a total value of the weighing values corresponds to a target weighing value, and configured to cause the hoppers corresponding to the combination to discharge the articles.

17. The combination weighing apparatus according to claim 15, wherein
the light emission unit is provided to be configured to selectively project the light on each of the hoppers, and
the projection controller controls the mode of the light projected from the light emission unit such that the mode of the light reflected from the hopper is changed, on the basis of the state information.

18. The combination weighing apparatus according to claim 16, wherein
the light emission unit is provided to be configured to selectively project the light on each of the hoppers, and
the projection controller controls the mode of the light projected from the light emission unit such that the mode of the light reflected from the hopper is changed, on the basis of the state information.

* * * * *